United States Patent
Nakada et al.

(10) Patent No.: US 11,205,986 B2
(45) Date of Patent: Dec. 21, 2021

(54) INVERTER DEVICE

(71) Applicants: Nidec Corporation, Kyoto (JP); Nidec Elesys Corporation, Kawasaki (JP)

(72) Inventors: Yuhi Nakada, Kyoto (JP); Ryo Tachibana, Kawasaki (JP); Koji Mukaiyama, Kawasaki (JP)

(73) Assignees: NIDEC CORPORATION, Kyoto (JP); NIDEC ELESYS CORPORATION, Kanagawa (JP)

( * ) Notice: Subject to any disclaimer, the term of this patent is extended or adjusted under 35 U.S.C. 154(b) by 7 days.

(21) Appl. No.: 16/795,831

(22) Filed: Feb. 20, 2020

(65) Prior Publication Data

US 2020/0313596 A1  Oct. 1, 2020

(30) Foreign Application Priority Data

Mar. 26, 2019  (JP) .............................. JP2019-058607

(51) Int. Cl.
| | |
|---|---|
| *H02P 27/04* | (2016.01) |
| *H02P 27/06* | (2006.01) |
| *B60L 3/00* | (2019.01) |
| *H02P 3/24* | (2006.01) |
| *B60L 50/51* | (2019.01) |
| *H02H 7/122* | (2006.01) |

(52) U.S. Cl.
CPC .............. *H02P 27/06* (2013.01); *B60L 3/003* (2013.01); *B60L 3/0061* (2013.01); *B60L 50/51* (2019.02); *H02H 7/1227* (2013.01); *H02P 3/24* (2013.01)

(58) Field of Classification Search
CPC .. H02P 27/06; H02P 3/24; B60L 50/51; B60L 3/003; B60L 3/0061; H02H 7/1227
USPC ......................................................... 318/801
See application file for complete search history.

(56) References Cited

U.S. PATENT DOCUMENTS

| | | | |
|---|---|---|---|
| 2017/0229884 A1* | 8/2017 | Tosch ..................... | B60L 3/0046 |
| 2017/0297435 A1* | 10/2017 | Wand ...................... | B60L 50/10 |
| 2017/0305274 A1 | 10/2017 | Saha et al. | |
| 2017/0331400 A1* | 11/2017 | Saha ........................ | H02P 6/12 |
| 2019/0097561 A1* | 3/2019 | Sato ........................ | H02M 7/48 |
| 2020/0036315 A1* | 1/2020 | Sato .................... | H02P 29/0241 |

* cited by examiner

*Primary Examiner* — Erick D Glass
(74) *Attorney, Agent, or Firm* — Keating & Bennett (57) ABSTRACT

An inverter device includes a motor, a power supply that supplies the motor with electric current, an inverter that, during regenerative operation of the motor, performs switching between a first state in which regenerative current generated in the motor is returned to the motor again and a second state in which the regenerative current is supplied to the power supply, a first detector that detects a first condition electrically acting on the inverter, a second detector that detects a second condition electrically acting on the power supply, and a determiner that performs a first determination to perform switching between the first state and the second state, based on a detection result by the first detector or the second detector.

10 Claims, 6 Drawing Sheets

INVERTER DEVICE

CROSS REFERENCE TO RELATED APPLICATION

The present invention claims priority under 35 U.S.C. § 119 to Japanese Application No. 2019-058607 filed on Mar. 26, 2019 the entire contents of which are hereby incorporated herein by reference.

1. FIELD OF THE INVENTION

The present disclosure relates to an inverter device.

2. BACKGROUND

Vehicles that can be driven by motor drive, such as hybrid vehicles and electric vehicles, are known. Such a vehicle includes a motor, a battery, and an inverter that converts a direct current supplied from the battery into an alternating current and supplies the alternating current to the motor. Further, the vehicle detects the rotation speed of the motor using a rotation sensor configured of a resolver or the like, and two kinds of control are selected and executed according to the detection result. One of the two kinds of control is shutdown control (SD control), and the other one is active short circuit control (ASC control). The shutdown control is control to turn off all switching elements of the inverter.

The active short circuit control is control in which either side of the upper switching elements of all the arms of the plurality of phases or the lower switching elements of all the arms of the plurality of phases is turned on and the other side is turned off.

In the vehicle described above, a threshold is set for the rotation speed of the motor detected by the rotation sensor, and control is selected based on the magnitude relationship between the threshold and the actual rotation speed. However, when the rotation sensor fails, it becomes difficult to make control selection redundant.

SUMMARY

Example embodiments of the present disclosure provide inverter devices that enable redundancy when switching between a first state in which regenerative current generated in a motor is returned to the motor again and a second state in which the regenerative current is supplied to a power supply, during regenerative operation of the motor.

An example embodiment of the present disclosure provides an inverter device including a motor, a power supply that supplies the motor with electric current to operate the motor, an inverter that, during regenerative operation of the motor, performs switching between a first state in which regenerative current generated in the motor is returned to the motor again and a second state in which the regenerative current is supplied to the power supply, a first detector that detects a first condition electrically acting on the inverter, a second detector that detects a second condition electrically acting on the power supply, and a determiner that performs a first determination to perform switching between the first state and the second state, based on a detection result by the first detector or the second detector.

The above and other elements, features, steps, characteristics and advantages of the present disclosure will become more apparent from the following detailed description of the example embodiments with reference to the attached drawings.

DETAILED DESCRIPTION

Hereinafter, inverter devices according to example embodiments of the present disclosure will be described in detail based on example embodiments shown in the accompanying drawings.

Figure 1:
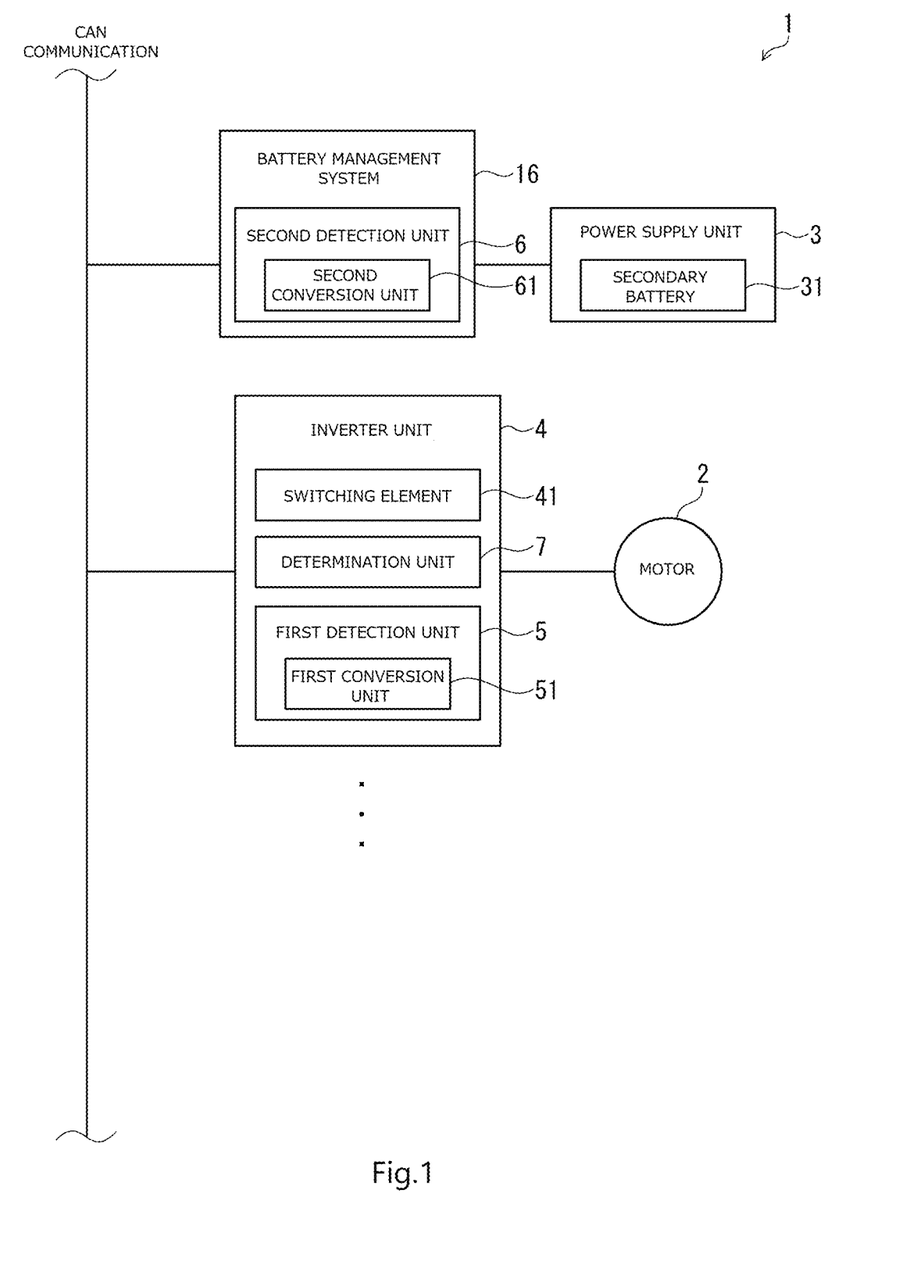
FIG. 1 is a block diagram showing main portions of an inverter device according to an example embodiment of the present disclosure.
Figure 2:
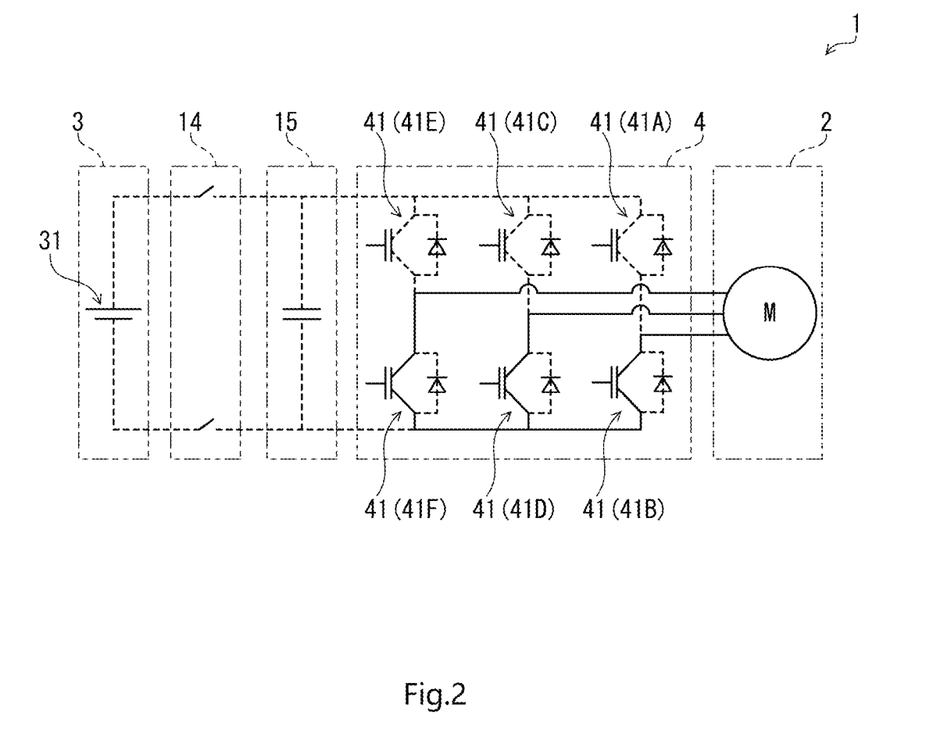
FIG. 2 is a circuit diagram (first state) showing main portions of an inverter device according to an example embodiment of the present disclosure.
Figure 3:
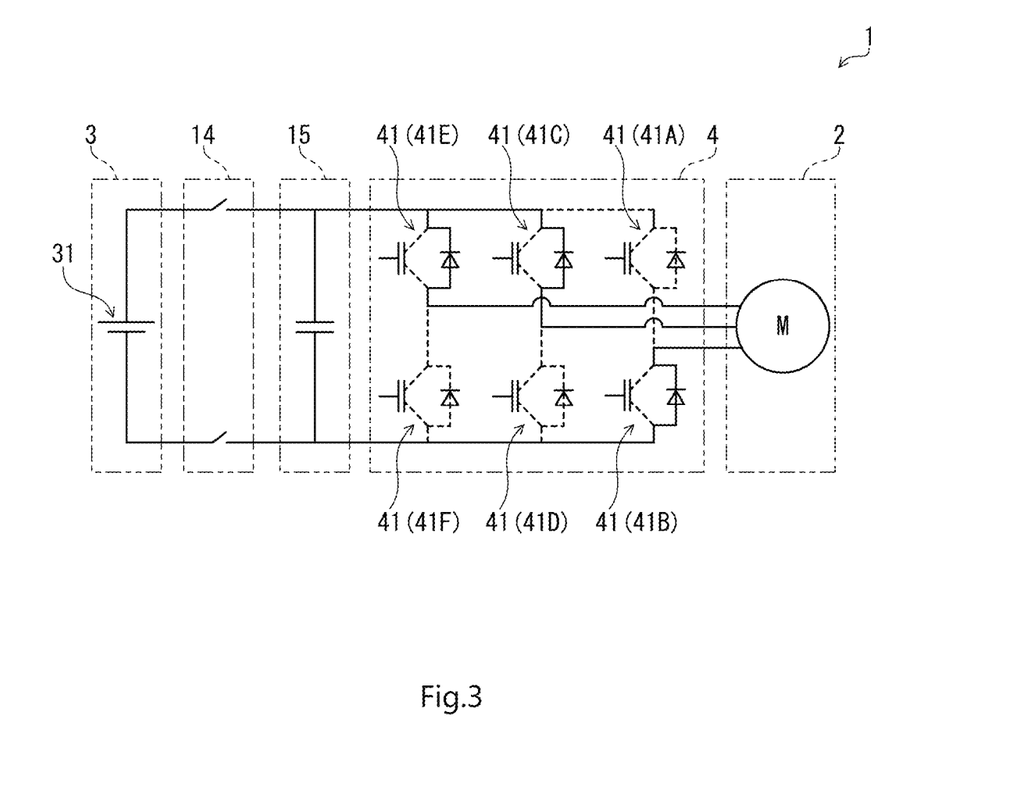
FIG. 3 is a circuit diagram (second state) showing main portions of an inverter device according to an example embodiment of the present disclosure.
Figure 4:
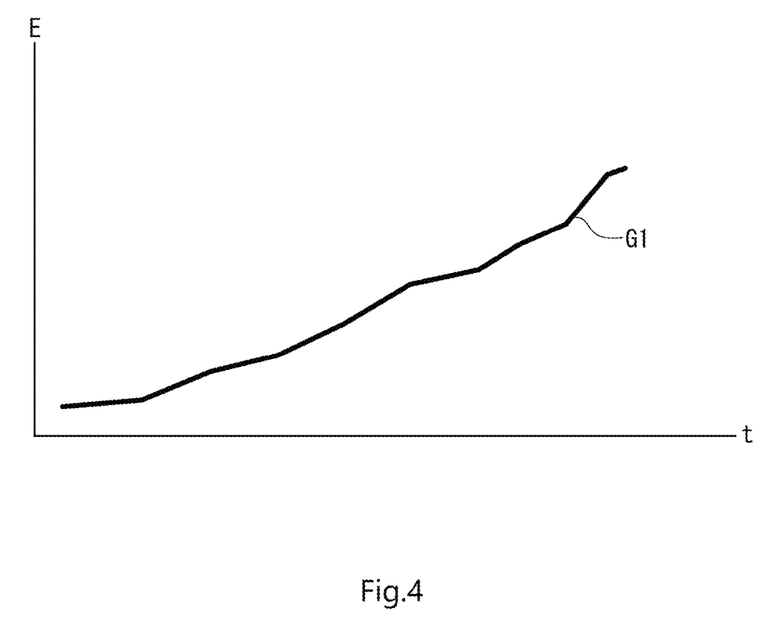
FIG. 4 is a graph illustrating an example of a change with time of the voltage detected by a determination unit when a first detection unit (or a second detection unit) is in a normal state.
Figure 5:
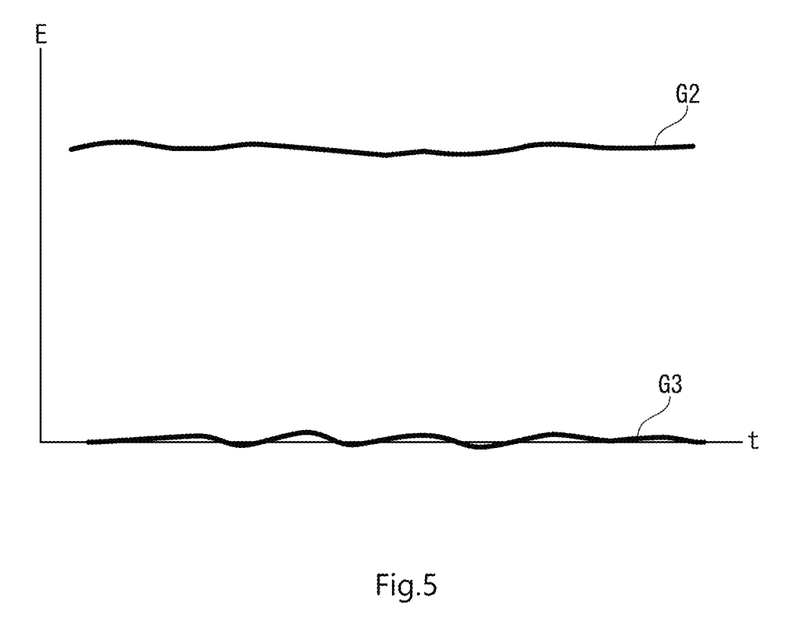
FIG. 5 is a graph showing an example of a change with time of the voltage detected by the determination unit when the first detection unit (or the second detection unit) is in a failed state.
Figure 6:
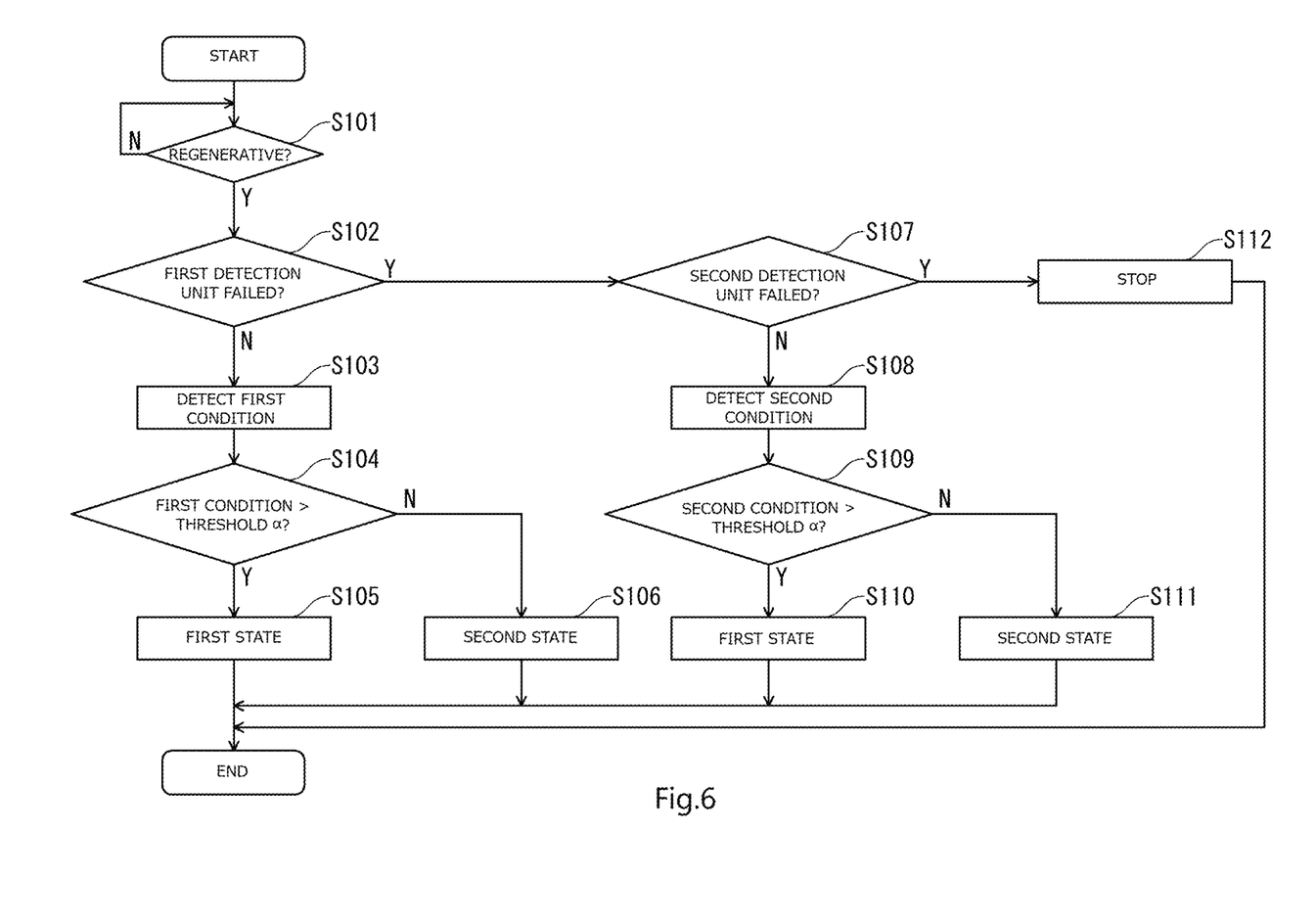
FIG. 6 is a flowchart showing a control program in an inverter device according to an example embodiment of the present disclosure.

FIG. 1 is a block diagram showing main parts of the inverter device of the present disclosure. FIG. 2 is a circuit diagram (first state) showing main parts of the inverter device of the present disclosure. FIG. 3 is a circuit diagram (second state) showing main parts of the inverter device of the present disclosure. FIG. 4 is a graph illustrating an example of a change with time of the voltage detected by a determination unit when a first detection unit (or a second detection unit) is in a normal state. FIG. 5 is a graph showing an example of a change with time of the voltage detected by the determination unit when the first detection unit (or the second detection unit) is in a failed state. FIG. 6 is a flowchart showing a control program in the inverter device of the present disclosure.

An inverter device 1 shown in FIG. 1 is mounted on a vehicle such as a hybrid vehicle (HEV), a plug-in hybrid vehicle (PHV), or an electric vehicle (EV), and is used as a power source thereof.

The inverter device 1 includes a motor 2, a power supply unit 3 that supplies the motor 2 with an electric current (electric power) for operating the motor 2, an inverter unit 4 that converts a direct current supplied from the power supply unit 3 into an alternating current, a first detection unit 5 that detects a first condition (for example, a voltage value) electrically acting on the inverter unit 4, a second detection unit 6 that detects a second condition (for example, a voltage value) electrically acting on the power supply unit 3, and a determination unit 7 that performs predetermined determination based on the detection result by the first detection unit 5 or the second detection unit 6. In the present example embodiment, the second detection unit 6 is mounted in a battery management system 16 that controls a secondary battery (battery) 31 of the power supply unit 3.

The units included in the inverter device 1 are electrically connected to each other via controller area network (CAN) communication as an on-vehicle network.

The power supply unit 3 includes the secondary battery 31 and can supply electric current to the motor 2 via the inverter unit 4. As a result, the motor 2 operates. In the inverter unit 4, the direct current supplied from the power supply unit 3 is converted into the alternating current. The motor 2 is a DC motor (three-phase motor) having three phases namely U phase, V phase, and W phase, and is supplied with the alternating current converted by the inverter unit 4. As shown in FIG. 1, the power supply unit 3 is connected to the CAN communication via the second detection unit 6.

As described above, the inverter device 1 is mounted on and used in, for example, a hybrid vehicle. In such a used state, the motor 2 may be regenerated. Cases where the motor 2 is regenerated include, for example, a case where a neutral vehicle is pulled and the motor 2 is forcibly rotated, and a case where a vehicle includes an engine in addition to the motor 2 and the motor 2 is forcibly driven by the engine.

In the regenerative operation of the motor 2, for example, for the purpose of protecting the secondary battery 31, a switching element 41 described below, or the like, the first state shown in FIG. 2 and the second state shown in FIG. 3 are switched from each other.

The first state is a state where the regenerative current generated in the motor 2 is returned to the motor 2 again during the regenerative operation of the motor 2. The control to set the first state is generally called "active short circuit control (ASC control)".

The second state is a state where the regenerative current generated in the motor 2 is supplied to the power supply unit 3 during the regenerative operation of the motor 2. The control to set the second state is generally called "shutdown control (SD control)".

Switching between the first state and the second state is performed by the inverter unit 4. As shown in FIGS. 2 and 3, the inverter unit 4 includes a plurality of (six in this example embodiment) switching elements 41. In the present example embodiment, three sets of two switching elements 41 connected in series are provided in parallel between the potential in the power supply unit 3 and the ground potential. Hereinafter, these switching elements 41 are referred to as, in order from the switching element 41 on the motor 2 side, an "upper switching element 41A", a "lower switching element 41B", an "upper switching element 41C", a "lower switching element 41D", an "upper switching element 41E" and a "lower switching element 41F". The upper switching element 41A, the upper switching element 41C, and the upper switching element 41E each are disposed (connected) on the positive side of the power supply unit 3 (battery 31), and the lower switching element 41B, the lower switching element 41D, and the lower switching elements 41F each are disposed (connected) on the negative side of the power supply unit 3 (battery 31).

Each switching element 41 is supplied with a PWM signal that is a pulse wave. A PWM signal supplied to each switching element 41 has a predetermined duty ratio. As the switching element 41, for example, an insulated gate bipolar transistor (IGBT) or a field effect transistor (FET) can be used.

Further, the inverter unit 4 is electrically connected to the power supply unit 3 via a switch 14 and a capacitor 15. The switch 14 can switch the state between a state where power can be supplied from the power supply unit 3 to the motor 2, and a state where the power supply is stopped. The capacitor 15 is provided in parallel with the two switching elements 41 connected in series.

As shown in FIG. 2, when the lower switching element 41B, the lower switching element 41D, and the lower switching element 41F are turned on, and the upper switching element 41A, the upper switching element 41C, and the upper switching element 41E are turned off, the first state is established. That is, active short circuit control is enabled. Note that the active short circuit control is not limited to that enabled by the state shown in FIG. 2. For example, it is also enabled when the upper switching element 41A, the upper switching element 41C, and the upper switching element 41E are turned on, and the lower switching element 41B, the lower switching element 41D, and the lower switching element 41F are turned off.

On the other hand, as shown in FIG. 3, when the switching elements from the upper switching element 41A to the lower switching element 41F are turned off, the second state is established. That is, shutdown control is enabled.

The first detection unit 5 is built in the inverter unit 4 and detects a first condition electrically acting on the inverter unit 4. The first condition is not particularly limited and includes, for example, the voltage applied from the power supply unit 3 to the inverter unit 4, the electric current flowing through the inverter unit 4, the electric power generated in the inverter unit 4, and the like. In the present example embodiment, as an example, the case where the first detection unit 5 detects the voltage applied from the power supply unit 3 to the inverter unit 4 as the first condition will be described. In this case, the first detection unit 5 is a voltmeter. A voltmeter is generally a measuring instrument with a simple configuration, is less likely to fail, and has excellent durability when used on a vehicle.

The second detection unit 6 detects a second condition electrically acting on the power supply unit 3. The second condition is not particularly limited, and includes, for example, the voltage applied to the power supply unit 3, the electric current flowing through the power supply unit 3, the electric power generated in the power supply unit 3, or the like. In the present example embodiment, as an example, the case where the second detection unit 6 detects the voltage applied to the power supply unit 3 as the second condition will be described. In this case, the same electrical physical quantity, that is, voltage, can be used for the first condition and the second condition. As a result, a program for switching control between a first state and a second state, which will be described later, has a simple configuration, so that the switching can be performed smoothly. Further, in the case where the second detection unit 6 detects voltage, the second detection unit 6 is a voltmeter, as in the first detection unit 5.

As shown in FIG. 1, the first detection unit 5 includes a first conversion unit 51 that converts the magnitude of the voltage (first condition). The first conversion unit 51 is not particularly limited. For example, an amplifier that amplifies an actually detected voltage value (actually measured value) can be used. As a result, the measurement range of the first detection unit 5 can be expanded, and accordingly, the effective range for voltage measurement (detection) can be expanded. Thereby, detection errors in the first detection unit 5 can be suppressed.

On the other hand, the second detection unit 6 also includes a second conversion unit 61 that converts the magnitude of the voltage (second condition). The second detection unit 6 is not particularly limited. For example, an amplifier that amplifies an actually detected voltage value (actual measured value) can be used. As a result, the measurement range of the second detection unit 6 can be expanded, and accordingly, the effective range for voltage measurement (detection) can be expanded. Thereby, detection errors in the second detection unit 6 can be suppressed.

The determination unit 7 determines switching between the first state and the second state, based on the detection result by the first detection unit 5 or the second detection unit 6. Hereinafter, this determination is referred to as "first determination". Specifically, the determination unit 7 performs the first determination based on a threshold a described below, depending on whether the detected value is higher or lower than the threshold a. In the present example embodiment, the determination unit 7 is built in the inverter unit 4 as shown in FIG. 1, and is configured of, for example, a central processing unit (CPU), various types of memories, and the like.

The first detection unit 5 and the second detection unit 6 may fail due to, for example, deterioration over time. In that case, the voltage cannot be accurately detected, and it is difficult to accurately perform the first determination.

Therefore, the inverter device 1 is configured to eliminate such a problem.

Hereinafter, this configuration and action will be described.

The determination unit 7 can perform second determination to determine presence or absence of a failure in the first detection unit 5 and presence or absence of a failure in the second detection unit 6. Then, the determination unit 7 can perform the first determination based on the result of the second determination. Since a method of determining presence or absence of a failure in the first detection unit 5 and a method of determining presence or absence of a failure in the second detection unit 6 are the same, a method of determining presence or absence of a failure in the first detection unit 5 will be described representatively. Note that such a determination method is an example, and the present disclosure is not limited thereto.

When the first detection unit 5 has not failed, that is, when the first detection unit 5 is in a state capable of detecting accurate voltage, during the regenerative operation, the voltage value detected by the first detection unit 5 is detected by being increased over time, as shown in graph G1 of FIG. 4. The "accurate voltage" is preferably determined by, for example, variations in hardware (such as electromagnetic noise of the switching element 41).

On the other hand, when the first detection unit 5 has failed, that is, when the first detection unit 5 is in a state incapable of detecting accurate voltage, a communication state from the first detection unit 5 is unstable (collapsed). Therefore, as shown in graph G2 of FIG. 5, the voltage value detected by the first detection unit 5 is almost unchanged and kept constant over time near the upper limit value of the detection range or, as shown in graph G3, the voltage value detected by the first detection unit 5 is almost unchanged and kept constant over time near the lower limit value of the detection range.

Then, the determination unit 7 obtains a graph indicating the relationship between the voltage value detected by the first detection unit 5 and the time, and can determine presence or absence of a failure in the first detection unit 5 depending on whether the graph approximates the graph of FIG. 4 or approximates the graph of FIG. 5. When the graph approximates the graph of FIG. 4, it is determined that the first detection unit 5 has not failed. Meanwhile, when the graph approximates the graph of FIG. 5, it is determined that the first detection unit 5 has failed.

As described above, the determination unit 7 determines presence or absence of a failure in the first detection unit 5 based on the change over time of the voltage value (first condition) detected by the first detection unit 5. Similar to the failure determination, the determination unit 7 can also determine presence or absence of a failure in the second detection unit 6 based on the change over time of the second condition detected by the second detection unit 6. Thereby, it is possible to stably and accurately determine presence or absence of a failure in the first detection unit 5 and the second detection unit 6.

Next, a program for switching control between the first state and the second state based on the first determination and the second determination will be described based on the flowchart shown in FIG. 6.

First, it is determined whether or not the motor 2 is in regenerative operation (step S101). When it is determined that the motor 2 is in regenerative operation, presence or absence of a failure in the first detection unit 5 is determined by the determination method described above (step S102). As a result of determination in step S102, when it is determined that the first detection unit 5 has no failure, the voltage value (first condition) applied to the inverter unit 4 is detected by the first detection unit 5 (step S103).

Next, it is determined whether or not the voltage value detected by the first detection unit 5 exceeds the threshold a (step S104). As a result of determination in step S104, when it is determined that the voltage value exceeds the threshold a, the inverter device 1 is determined to be in the first state (step S105). On the other hand, as a result of determination in step S104, when it is determined that the voltage value does not exceed the threshold a, the inverter device 1 is determined to be in the second state (step S106). Note that the threshold a can be set arbitrarily, but when a voltage value is used as the first condition (or the second condition), the threshold a is determined based on the breakdown voltage of each switching element 41, for example. The threshold a is stored in the determination unit 7 and can be changed (rewritten) as appropriate.

Further, as a result of determination in step S102, when it is determined that the first detection unit 5 has a failure, presence or absence of a failure in the second detection unit 6 is determined by the determination method described above (step S107). As a result of determination in step S107, when it is determined that the second detection unit 6 has no failure, the voltage value (second condition) applied to the power supply unit 3 is detected by the second detection unit 6 (step S108).

Then, it is determined whether or not the voltage value detected by the second detection unit 6 exceeds the threshold a (step S109). As a result of determination in step S109, when it is determined that the voltage value exceeds the threshold a, the inverter device 1 is determined to be in the first state (step S110). On the other hand, as a result of determination in step S109, when it is determined that the voltage value does not exceed the threshold a, the inverter device 1 is determined to be in the second state (step S111).

As a result of determination in step S107, when it is determined that the second detection unit 6 has a failure, the operation of the entire inverter device 1 is stopped (step S112).

As described above, when the determination unit 7 determines that the first detection unit 5 has no failure in the second determination, the determination unit 7 performs first determination based on the detection result by the first detection unit 5 (in the execution order of step S102, step S103, step S104, step S105 or step S106). In this step, when the first condition exceeds the threshold a, the determination unit 7 performs the first determination for switching to the first state (in the order of step S104, step S105). Further, when the first condition falls below the threshold a, that is, when the first condition does not exceed the threshold a, the determination unit 7 performs the first determination for switching to the second state (in the order of step S104, step S106).

Further, when the determination unit 7 determines that the second detection unit 5 has no failure in the second determination, the determination unit 7 performs the first determination based on the detection result by the second detection unit 6 (in the execution order of step S107, step S108, step S109, step S110 or step S111). In this step, the determination unit 7 performs the first determination for switching to the first state when the second condition exceeds the threshold a (step S109, step S110). Further, when the second condition falls below the threshold a, that is, when the second condition does not exceed the threshold a, the determination unit 7 performs the first determination for switching to the second state (in the execution order of step S109, step S111).

With such control, even when one of the first detection unit 5 and the second detection unit 6 fails, the first determination is accurately performed using the detection result of the other detection unit. That is, switching between the first state and the second state can be performed accurately. Therefore, in the inverter device 1, redundancy can be realized when switching is performed between the first state and the second state, and the motor 2 can be operated accurately even if the first detection unit 5 or the second detection unit 6 fails. Moreover, the burden on the power supply unit 3 and each switching element 41 can be reduced.

In addition, when the determination unit 7 determines that the first detection unit 5 has a failure in the second determination and determines that the second detection unit has no failure, the determination unit 7 performs the first determination based on the detection result by the second detection unit 6 (in the execution order of step S102, step S107, step S108, step S109, step S110 or step S111). In the flowchart shown in FIG. 6, the execution order of step S102 and step S107 may be reversed. In that case, when the determination unit 7 determines that the second detection unit 5 has a failure and determines that the first detection unit has no failure in the second determination, the determination unit 7 performs the first determination based on the detection result by the first detection unit 5. Thus, the determination unit 7 can accurately perform the first determination regardless of the execution order of the failure determination of the first detection unit 5 and the failure determination of the second detection unit 6.

In addition, when the determination unit 7 determines that the first detection unit 5 has a failure in the second determination and determines that the second detection unit 6 has a failure, the control of the entire inverter device 1 is stopped (in the execution order of step S102, step S107, step S112). As a result, when both the first detection unit 5 and the second detection unit 6 fail, the entire inverter device 1 can be protected.

As described above, the first detection unit 5 detects a first condition electrically acting on the inverter unit 4, and the second detection unit 6 detects a second condition electrically acting on the power supply unit 3. Then, as the first condition, the voltage applied to the inverter unit 4, the electric current flowing through the inverter unit 4, or the electric power generated in the inverter unit 4 is used, and as the second condition, the voltage applied to the power supply unit 3, the electric current flowing through the power supply unit 3, or the electric power generated in the power supply unit 3 is used. Thereby, the same physical quantity (voltage in the present example embodiment) can be used for the first condition and the second condition. Further, the magnitude relationship between each condition and the threshold a can be compared using a common threshold a for each condition.

Then, first determination is made based on the magnitude relationship.

On the other hand, for example, in the case where the first determination is made based on the rotation speed of the motor 2, determination is made under one condition, that is, the rotation speed of the motor 2. Therefore, it is impossible to realize redundancy when switching is performed between the first state and the second state. Further, when two rotation angle sensors for detecting the rotation angle of the motor 2 are disposed, the space for disposing the rotation angle sensors is required. Therefore, the inverter device 1 may be increased in size, for example. Since the inverter device 1 is for on-vehicle use as described above, it is preferable that the inverter device 1 be downsized. Further, the case where a plurality of rotation angle sensors are disposed causes a problem that alignment between each rotation angle sensor and the rotor of the motor 2 becomes difficult in assembly.

As mentioned above, although the illustrated example embodiment of the inverter device of the present disclosure has been described, the present disclosure is not limited to this, and each unit constituting the inverter device may be replaced by one having any configuration capable of exhibiting the same function. Moreover, arbitrary components may be added.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An inverter device comprising:
   a motor;
   a power supply that supplies the motor with electric current to operate the motor;
   an inverter that, during regenerative operation of the motor, performs switching between a first state in which regenerative current generated in the motor is returned to the motor again and a second state in which the regenerative current is supplied to the power supply;
   a first detector that detects a first condition electrically acting on the inverter;
   a second detector that detects a second condition electrically acting on the power supply; and
   a determiner that performs a first determination to perform switching between the first state and the second state, based on a detection result by the first detector or the second detector.

2. The inverter device according to claim 1, wherein the determiner performs the first determination to switch to the first state when the first condition exceeds a threshold, and performs the first determination to switch to the second state when the first condition does not exceed the threshold.

3. The inverter device according to claim 2, wherein the determiner performs the first determination to switch to the first state when the second condition exceeds a threshold, and performs the first determination to switch to the second state when the second condition does not exceed the threshold.

4. The inverter device according to claim 3, wherein the determiner performs a second determination to determine presence or absence of a failure in the first detector and presence or absence of a failure in the second detector, and the determiner performs the first determination based on a result of the second determination.

5. An inverter device comprising:
a motor;
a power supply that supplies the motor with electric current to operate the motor;
an inverter that, during regenerative operation of the motor, performs switching between a first state in which regenerative current generated in the motor returned to the motor again and a second state in which the regenerative current is supplied to the power supply;
a first detector that detects a first condition electrically acting on the inverter;
a second detector that detects a second condition electrically acting on the power supply; and
a determiner that performs a first determination to perform switching between the first state and the second state, based on a detection result by the first detector or the second detector; wherein
the determiner performs the first determination to switch to the first state when the first condition exceeds a threshold, and performs the first determination to switch to the second state when the first condition does not exceed the threshold;
the determiner performs the first determination to switch to the first state when the second condition exceeds a threshold, and performs the first determination to switch to the second state when the second condition does not exceed the threshold;
the determiner performs a second determination to determine presence or absence of a failure in the first detector and presence or absence of a failure in the second detector and the determiner performs the first determination based on a result of the second determination; and
when the determiner determines that the first detector has no failure in the second determination, the determiner performs the first determination based on a detection result by the first detector, and when the determiner determines that the second detector has no failure in the second determination, the determiner performs the first determination based on a detection result by the second detector.

6. The inverter device according to claim 5, wherein when the determiner determines that the first detector has a failure and the second detector has no failure in the second determination, the determiner performs the first determination based on a detection result by the second detector, and when the determiner determines that the second detector has a failure and the first detector has no failure in the second determination, the determiner performs the first determination based on a detection result by the first detector.

7. The inverter device according to claim 6, wherein when the determiner determines that the first detector has a failure and the second detector has a failure in the second determination, the control is stopped.

8. The inverter device according to claim 2, wherein the determiner determines presence or absence of a failure in the first detector based on a change over time of the first condition, and determines presence or absence of a failure in the second detector based on a change over time of the second condition.

9. The inverter device according to claim 1, wherein
the first detector detects, as the first condition, voltage applied to the inverter from the power supply, electric current flowing through the inverter, or electric power generated in the inverter; and
the second detector detects, as the second condition, voltage applied to the power supply, electric current flowing through the power supply, or electric power generated in the power supply.

10. An inverter device comprising:
a motor;
a power supply that supplies the motor with electric current to operate the motor;
an inverter that, during regenerative operation of the motor, performs switching between a first state in which regenerative current generated in the motor is returned to the motor again and a second state in which the regenerative current is supplied to the supply;
a first detector that detects a first condition electrically acting on the inverter;
a second detector that detects a second condition electrically acting on the power supply; and
a determiner that performs a first determination to perform switching between the first state and the second state, based on a detection result by the first detector or the second detector; wherein
the first detector detects, as the first condition, voltage applied to the inverter from the power supply, electric current flowing through the inverter, or electric power generated in the inverter;
the second detector detects, as the second condition, voltage applied to the power supply, electric current flowing through the power supply, or electric power generated in the power supply;
the first detector includes a first converter that converts a magnitude of the first condition; and
the second detector includes a second converter that converts a magnitude of the second condition.

* * * * *